United States Patent [19]

Masclet

[11] 4,189,192
[45] Feb. 19, 1980

[54] APPARATUS FOR ADJUSTING THE APPLICATION OF BRAKES TO THE WHEELS OF VARIOUS TYPES OF VEHICLES

[75] Inventor: Jean Masclet, Paris, France

[73] Assignee: Messier-Hispano, Montrouge, France

[21] Appl. No.: 914,299

[22] Filed: Jun. 9, 1978

Related U.S. Application Data

[63] Continuation-in-part of Ser. No. 868,462, Jan. 10, 1978, Pat. No. 4,138,164, which is a continuation of Ser. No. 565,253, Apr. 4, 1975, abandoned.

[30] Foreign Application Priority Data

Apr. 12, 1974 [FR] France .................................. 74 13045

[51] Int. Cl.² .............................................. B60T 8/08
[52] U.S. Cl. .............................. 303/105; 188/181 A; 244/111
[58] Field of Search ............... 188/181 A; 303/20, 97, 303/105, 106, 110, 111; 244/111

[56] References Cited

U.S. PATENT DOCUMENTS

| | | | |
|---|---|---|---|
| 3,552,803 | 1/1971 | Lucien | 303/105 |
| 3,615,120 | 10/1971 | Yamazaki et al. | 303/97 |
| 3,936,941 | 2/1976 | Hiscox | 303/105 |
| 3,980,349 | 9/1976 | Cook | 303/110 |
| 4,138,164 | 2/1979 | Masclet | 244/111 X |

*Primary Examiner*—Reinhard J. Eisenzopf
*Attorney, Agent, or Firm*—Haseltine, Lake & Waters

[57] ABSTRACT

An apparatus for adjusting the braking force of brakes applied to vehicle wheels in which the brakes are operated under the control of an electromagnet as a function of the deceleration and acceleration of the wheels. For a given braking signal, the braking force is eliminated when the deceleration of the braked wheel exceeds a predetermined threshold value, which may occur, for example, when the wheel starts to freely skid, and the reapplication of the braking force is delayed for a period of time proportional to the magnitude of deceleration of the wheel and inversely proportional to the subsequent magnitude of acceleration of the wheel when it picks up speed only when such acceleration exceeds a threshold which permits the wheel to gain speed irrespective of the frictional adherence of the wheel to the ground.

4 Claims, 4 Drawing Figures

APPARATUS FOR ADJUSTING THE APPLICATION OF BRAKES TO THE WHEELS OF VARIOUS TYPES OF VEHICLES

CROSS-RELATED APPLICATION

This application is a continuation-in-part of Ser. No. 868,462 filed Jan. 10, 1978 and issued as U.S. Pat. No. 4,138,164 which in turn is a continuation of Ser. No. 565,253 filed Apr. 4, 1975 and now abandoned.

FIELD OF THE INVENTION

The invention relates to a system for adjusting braking forces and is applicable to various types of vehicles such as, for example, automobiles and, particularly, aircraft.

PRIOR ART

It is known that such systems have the object of correcting the braking rate as a function of the deceleration and the acceleration of braked wheels of the vehicles such that:
 if due to frictional adherence of the wheel, the braking couple resulting from the applied braking force is less than a permissible value, the deceleration of the wheel and that of the vehicle is less than an operational threshold of the control system and such control system will not operate;
 if, in contrast, the braking couple is greater than the permissible value, the wheel begins to skid with considerable deceleration and the control system then produces a disengagement of the brake and the wheel can then pick up speed.

This adjusting system must also take into account frictional adherence conditions when the wheel begins to turn again such that, for example, for considerable deceleration of the wheel followed by slight acceleration, the braking force is re-applied only after a lengthy delay. In contrast, if the acceleration is considerable that is to say, if the wheel picks up speed rapidly, the braking force is re-applied after a very short time.

SUMMARY OF THE INVENTION

To achieve this result, the invention contemplates firstly an adjustment system which permits control of the braking members or the brakes as a function of the deceleration or the acceleration of each of the braked wheels of the vehicles such that, on the one hand for a given rate of braking, the braking action is suppressed when the deceleration of the braked wheel passes a threshold, called the operational threshold, (which may occur, for example, when the wheel starts to freely skid) and on the other hand, the re-application of the braking force is delayed in proportion to the magnitude of deceleration of the wheel and inversely proportional to the magnitude of acceleration when the wheel picks up speed only when the acceleration exceeds a threshold which permits the wheel to gain speed irrespective of the frictional adherence of the wheel to the ground.

In this regard according to a feature of the invention, such an adjustment system comprises for each of the wheels (or set of wheels):
 a tachometric generator furnishing a signal as a function of the speed of the wheel,
 a differentiator receiving the signal and furnishing a signal whose frequency is proportional to the acceleration or to the deceleration of the wheel,
 threshold means having a variable gain as a function of the frequency connected to the output of the differentiator and whose threshold corresponds to a zero input voltage;
 a first diode connected to the output of the threshold means and which only transmits acceleration signals to;
 a memory comprising in series a capacitor and a resistance connected between the output of the first diode and ground;
 a threshold arrangement associated with a power amplifier which controls the excitation of the coil of an electromagnet disposed in series in the braking circuit of the wheel to energize the braking circuit according to whether the voltage applied to the memory is less than or greater than a predetermined threshold;
 a first discharge circuit for the memory consisting of a resistance mounted in parallel with said capacitor; and
 a second discharge circuit comprising in series a second diode which only passes acceleration signals and which is connected to the control terminal of a discharge circuit, with constant current, for said capacitor, said discharge circuit having a predetermined threshold.

Such a system requires a DC source with positive and negative outputs which constitutes a disadvantage since, in general, there is not provided on the vehicle a DC source of positive voltage.

Furthermore, in this system the threshold values of the means having variable gain and of the threshold arrangement are independent such that they are subject to incoherent variations between one another which can be translated into an erroneous operational threshold, this operational threshold being, in effect, a function of the error between these values.

In addition, the discharge of the memory is only, in part, a function of the instantaneous condition of the wheel, notably when the resistance mounted in parallel with the memory capacitor is connected to ground.

To overcome these disadvantages, the invention contemplates, according to a first feature of the invention, an improved regulation system which comprises for each of the braked wheels of the vehicle:
 a tachometric generator furnishing a signal as a function of the speed of the wheel;
 a combination differentiator and threshold amplifier having a variable gain as a function of frequency connected to the output of said generator;
 a memory constituted by a first resistance mounted in series with a capacitor connected to the differentiator/amplifier assembly by means of a diode adapted to prevent discharge of the memory;
 a threshold means connected to the output of the said diode;
 a power amplifier connected to the output of the threshold means for controlling the coil of an electromagnet mounted in series in the braking circuit of the wheel;
 a first discharge circuit for the memory consisting of a second resistance mounted between the output of the differentiator/amplifier and the capacitor; and
 a voltage bridge divider having two outputs respectively controlling the value of the thresholds of the differentiator/amplifier assembly and that of the threshold means.

Preferably, the first discharge circuit and the second discharge circuit are two separate circuits, both connected to the output of the differentiator/amplifier assembly to effect a discharge of the memory in accordance with the state of the wheel, the first discharge circuit not having a threshold and the second discharge circuit having a threshold obtained by means of a transistor whose collector is connected to the junction of the first resistance and the capacitor, whose emitter is connected to the output of the differentiator/amplifier assembly and whose base is polarized by means of a resistance bridge disposed between ground and the positive terminal of a voltage source which defines the value of the threshold of switching.

BRIEF DESCRIPTION OF THE DRAWINGS

An embodiment of the invention will be described hereafter by way of non-limitative example with reference to the attached drawings in which.

DETAILED DESCRIPTION

Figure 1:
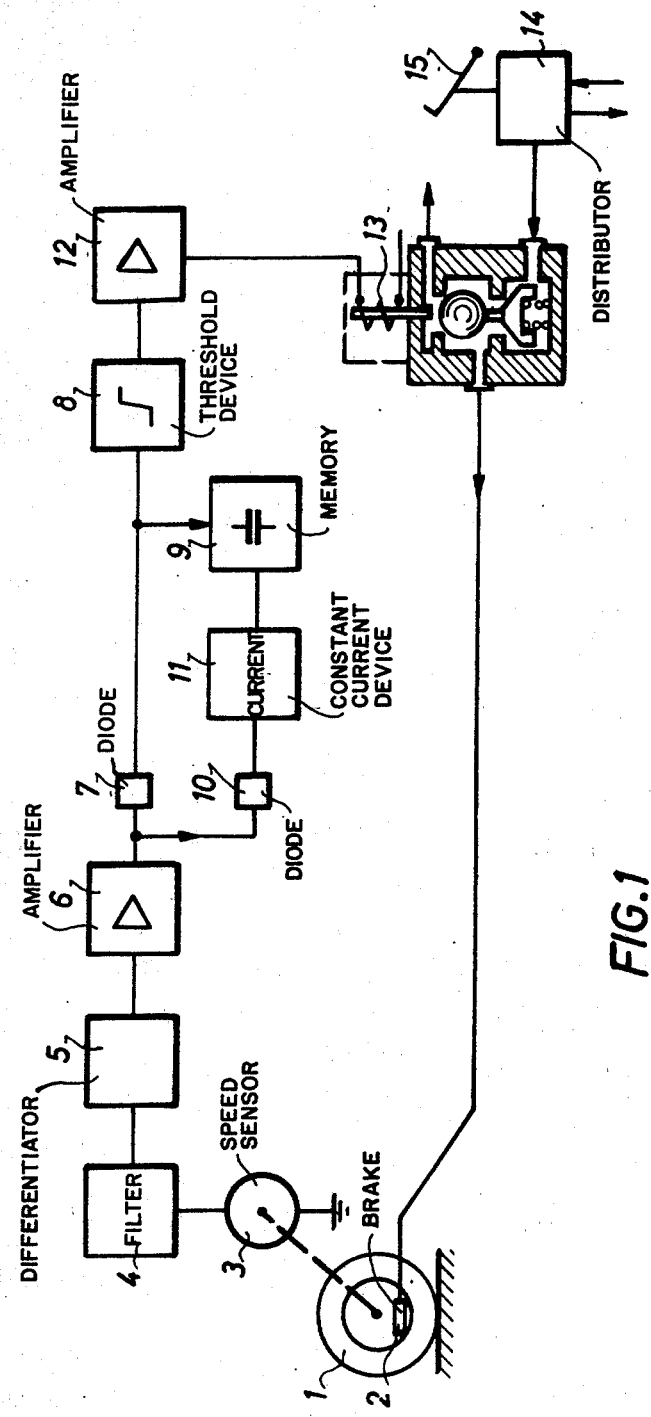
FIG. 1 is a schematic block diagram of an adjustment system for braking according to a first embodiment of the invention.

With reference to FIG. 1, a braked wheel 1 provided with a brake 2, drives a device 3 such as a tachogenerator for electrically measuring the speed of the wheel. The output signal from the tachogenerator is transmitted to a filtering circuit 4 which eliminates parasitic noise. The signal from the filter circuit 4 is transmitted to a differentiator 5 which furnishes a signal corresponding to the derivative of the speed of wheel 1 with respect to time. The signal from differentiator 5 is amplified in an amplifier 6 having a variable gain as a function of the frequency of the signal so as to reduce the signals produced by vibrations of the wheel and by the means by which the wheel is secured to the vehicle. The output of the amplifier 6 is connected through a diode 7 which only passes deceleration signals to a threshold device 8 which sends a control signal to the coil of an electromagnet 13 via a power amplifier 12 when the differentiated signal is greater than the threshold of device 8; the signal from the diode 7 also charges a memory 9.

Through the intermediary of a diode 10, which only passes acceleration signals, the differentiated signal from the amplifier 6 controls, during the acceleration stage of the wheel, the discharge of the memory 9 through constant current device 11, when the acceleration signals exceeds an acceleration threshold.

The electromagnet 13 receives from a distributor 14 the braking pressure control from brake pedal 15 and transmits it to the brake 2 when the coil is not energized.

Thus, with the vehicle at a given speed, following a braking signal controlled by the pedal 15, the pressure delivered by the distributor 14 is transmitted to the brake 2 since the electromagnet 13 is not energized.

This pressure produces a braking force which applies a braking couple or moment on the wheel which causes deceleration $\gamma$ of the wheel 1.

If, because of the frictional adherence of the wheel with the ground, the braking couple is less than a permissible couple, the deceleration of the wheel corresponds to that of the vehicle and is less than the operational threshold of the element 8. Consequently, the system does not become operative.

In contrast, if the braking couple is greater than the permissible couple, the wheel starts to skid with considerable deceleration.

The signal that enters the threshold device 8 is then greater than the threshold value and the coil of the electromagnet 13 is energized by the power amplifier 12. The hydraulic pressure in the brake decreases and the wheel can pick-up speed again.

The memory 9 stores the maximum value of deceleration, that is, the value taken at the moment when the deceleration is maximum. When the wheel starts turning again, the output signal of the amplifier 6 changes sign but the electromagnet 13 remains energized by the discharge from the memory.

To take into account the conditions of frictional adherence during the time when the wheel is again picking up speed, the acceleration signal obtained at the output of the diode 10 will short circuit the memory 9 beyond a threshold value $\gamma_s$ by means of the discharge device 11 and this will occur proportionally to the value of the acceleration of the wheel. Thus, for a high deceleration followed by a low acceleration the memory will take a long time to discharge and the pressure will be re-applied to the brake 2 only after a lengthy delay. In contrast, if the acceleration is great that is to say, if the wheel picks up speed rapidly, the memory will be discharged rapidly by the discharge device 11 and the pressure will be re-applied to the brake after a very short time.

Additionally, if the deceleration is low, that is to say, if the wheel has not skidded over a great distance, the memory is not charged to a great extend and its discharge will be very rapid. The pressure will therefore be rapidly applied to the brake.

The desired operation is thus achieved and the wheel will have time to pick-up speed under all conditions of frictional adherence.

Figure 2:
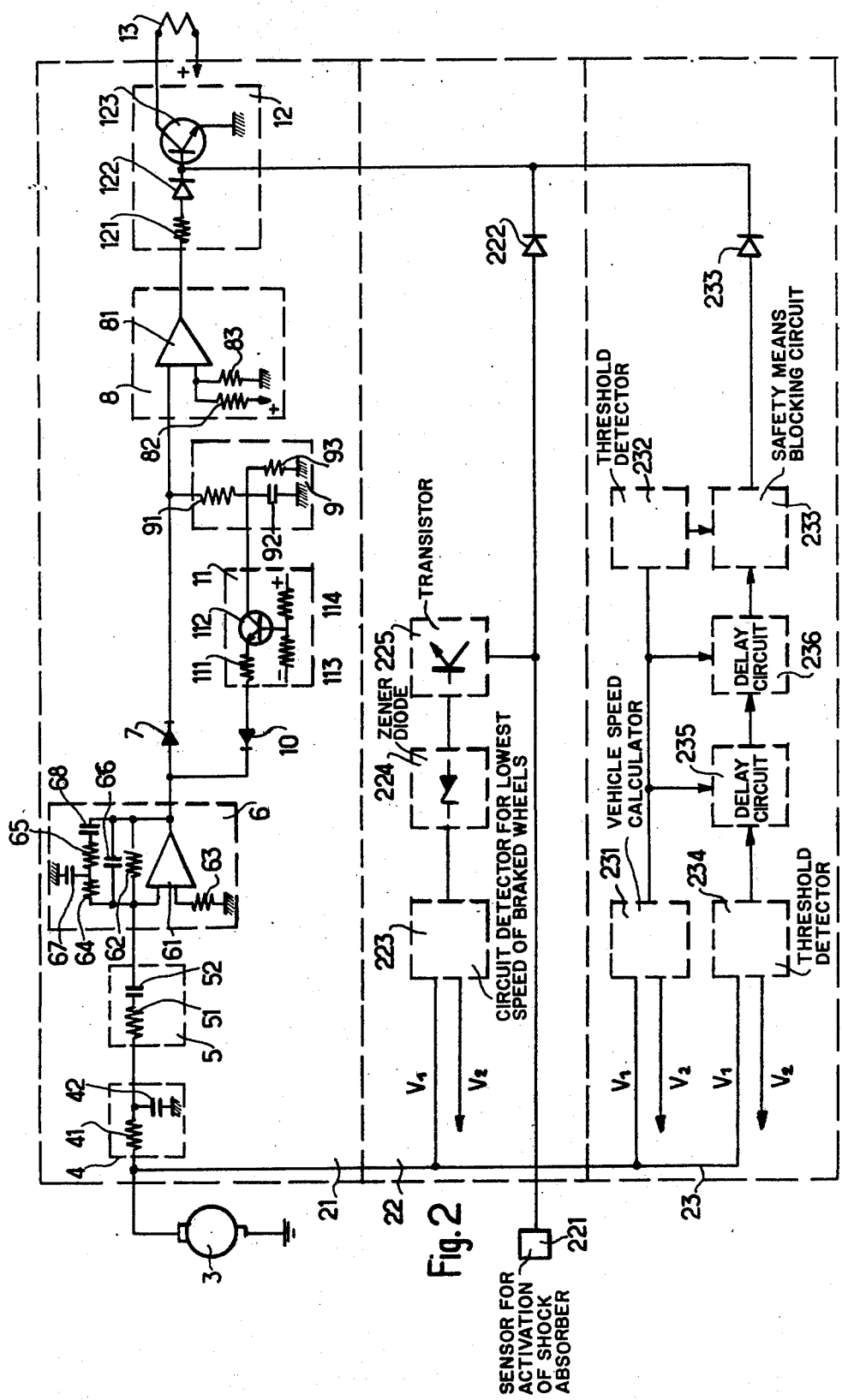
FIG. 2 schematically shows an adjustment system for braking associated with an impact safety device and with a safety device for preventing locking of the braked wheels.

Referring to FIG. 2 which shows the application of the process according to the invention to a vehicle having two wheels with controlled brakage, the regulation system comprises an independent regulation circuit for each wheel and common safety means. FIG. 2 only shows one of the two circuits associated with each of the two wheels, the second circuit being identical. This circuit comprises tachometric generator 3 associated with the wheel, a circuit arrangement of previously described elements 4,5,6,7,8,9,10,11 and 12 and corresponding electromagnet 13. This circuit may additionally comprise an impact safety circuit 22 as well as an anti-locking safety circuit 23 effecting complete disengagement of the brakes whenever the vehicle is not in contact with the ground as well as when a wheel is unexpectedly locked. For each of the wheels, the signal from the tachometric generator 3 is filtered in the block 4 by a resistor 41 connected in series and capacitor 42 connected to ground. The output voltage is fed to differentiator 5 constituted by a resistor 51 and a capacitor 52 disposed in series. The differentiated signal is then fed to amplifier 6 having variable gain as a function of the frequency and consituted by operational amplifier 61 counteracted by a resistor 62. The second input of the operational amplifier 61 is connected to ground through a resistor 63.

A feedback circuit constituted by resistor 64, 65 and condensor 66, 67 and 68 enables gain in frequency to be adapted in a manner to attenuate the frequencies corresponding to the vibrations of the wheel and of its means of attachment to the vehicle.

The output signal from the amplifier 61 is fed successively:
through the diode 7 to a threshold detection circuit 8 constituted by an operational amplifier 81 serving as a comparator whose second input receives a positive voltage defining the threshold value through a resistance bridge 82 and 83 disposed between ground and the positive terminal of the voltage source;
through the same diode 7 to memory circuit 9 comprising a charging resistor 91, a memory capacitor 92 and a discharge resistor 93;
through the diode 10 to circuit 11 for discharge of the memory capacitor 92 constituted by a series resistor 111, a current-control transistor 112 whose base is biassed by the resistance bridge 113 and 114 determining a threshold below which this circuit will not operate, the emitter of transistor 112 being connected to the resistor 111 while its collector is connected to the memory capacitor 92 to effect a discharge proportional to the acceleration of the wheel.

The output signal of the threshold detection circuit 8 controls power amplifier 12 comprising in series a resistor 121, a diode 122 connected to the base of a power transistor 123 whose collector is connected to the coil of the electromagnet 13.

Thus, when the wheel starts to skid, the voltage delivered by the tachogenerator decreases thus producing a positive signal proportional to the deceleration at the output of the amplifier 6.

At the output of the diode 7, this signal is compared to the threshold voltage in block 8; if the signal is greater than this threshold voltage, the block 8 sends a signal which operates the transistor 123 to permit the passage of current in the coil of the electromagnet.

The deceleration signal passing through the charging resistor 91 will charge the memory capacitor 92 in proportion to the value of the signal as well as to its duration which ensures that the electromagnet continues to be energized after cessation of the deceleration signal.

The unbraked wheel picks up speed and produces an acceleration signal at the output of amplifier 6 which passes through the diode 10, the resistor 111 and the transistor 112 to produce discharge of the memory in proportion to the value of the acceleration, and when the voltage passed into the memory drops below the threshold voltage of the block 8, the control signal for excitation of the coil of the electromagnet 13 is suppressed which consequently causes, after a variable time, the wheel to pick up speed again.

The regulation system shown in FIG. 2 also comprises an impact safety device which itself is known and is applicable to aircraft, notably to prevent brakage whenever the vehicle is not in contact with the runway. In this regard, a switch 221 associated with the means by which the braked wheel is secured to the vehicle, indicates whether its shock absorber is compressed or not. The signal produced when the shock absorber is not compressed is sent through diode 222 to power amplifier 12 of each adjustment circuit to effect the excitation of the coils 13 of the electromagnet thereby preventing the brakes from becoming pressurized. In addition, a circuit 223 which detects the lowest speed of the braked wheels short-circuits, through a Zener diode threshold detector 224 and through a transistor 225, the signal sent through the shock absorber switch and thus makes it possible to apply the brakes if the wheels of the vehicle are rotated even if the shock absorbers are not compressed.

This is necessary since in the case of an aircraft and due to its lift, the vehicle may already be in contact with the runway while the shock absorbers are not compressed.

The control means can also comprise known safety means 23 for preventing locking of the braked wheels.

This circuit is only operative when the speed of the vehicle is greater than a given speed V in order to permit braking at low speeds as well as when the vehicle is stopped.

When the circuit is operative, if one of the braked wheels is at a speed less than the reference speed $V_1$ this circuit causes disengagement of the brakes of this wheel and of the symmetrical wheel in order to maintain the direction of travel of the vehicle.

The speed of the vehicle is calculated in the block 231 by taking the greatest of the speeds of the braked wheels, this signal being stored in the memory and released in the event of simultaneous locking of all of the wheels following deceleration greater than the maximum which can be obtained by the vehicle under the best conditions of frictional adherence. This enables safety to be maintained when all the wheels are locked simultaneously which could cause a zero vehicle speed signal and therefore deactivation of the safety system, if there were no memory.

The signal for speed of the vehicle coming from block 231 enters a threshold detector 232 which sends a signal to an interruption circuit 233 blocking the operation of the safety means when the speed of the vehicle is less than V.

The speed signals coming from the tachometric generators 3 also pass into a threshold detector 234 which when one of the signals is less than the speed $V_1$ sends a signal for brake disengagement to the power amplifiers of the corresponding adjustment circuits through the block 233 and diode 233'.

When the wheel picks up speed and its speed again exceeds $V_1$, the signal for brake release is suppressed but after a delay (block 236) proportional to the speed of the vehicle so as to enable the wheel to reach synchronous speed before further skidding is produced.

Finally, a circuit 235 for delay of operation of the safety circuit, which is operative a low vehicle speeds, enables the safety means to be used only intentionally in view of the fact that at speeds slightly higher than the reference speed V it is possible for the speed of one wheel to drop below $V_1$ without any fault in the adjusting system, the delay making it possible to check whether the wheel picks up speed by the operation of the adjusting system before the safety means is operated.

It will be noted that the transmission of control signals from the circuits 22 and 23 to the block 12 occurs between the diode 122 and the power transistor 123.

Figure 3:
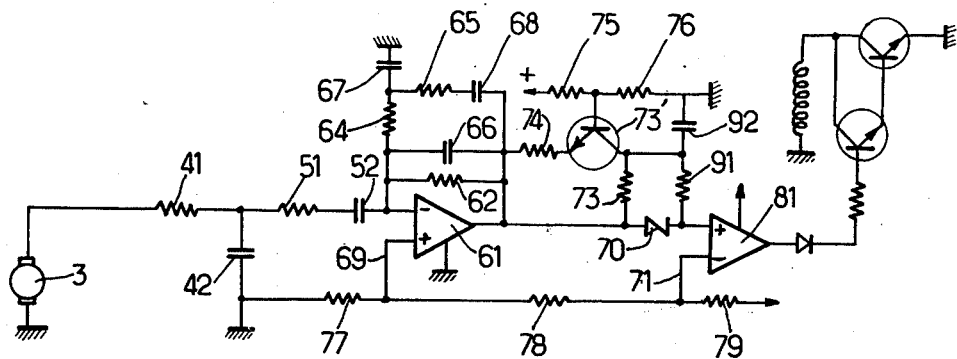
FIG. 3 is a circuit diagram of a preferred embodiment of the adjustment system according to the invention.

With reference to FIG. 3, the adjustment system for braking comprises, firstly a system analogous to that described previously, inclusive of tachometric generator 3 whose speed signal is filtered by means of a filter constituted by a resistor 41 and capacitor 42 which is connected to a differentiator comprising a resistor 51 and a capacitor 52 connected in series.

The acceleration or deceleration signal sent from the differentiator is then transmitted to an amplifier having a variable gain as a function of the frequency and a threshold which permits suppression of resonance frequencies from the incoming signals to eliminate signals produced by vibration.

The amplifier comprises, in a manner similar to that previously, an operational amplifier 61 counteracted by means of a network of impedances comprising capacitors 66,67 and 68 and resistors 62,64 and 65 and whose threshold value is determined by the voltage applied to the direct input 69.

The operational amplifier 61 is connected at its output through a diode 70 to a memory circuit comprising in series a resistor 91 and a capacitor 92 connected to ground, the diode 70 preventing discharge of this memory. The diode 70 is also connected at its output to the direct input of a threshold device which consists of operational amplifier 81 whose threshold value is determined by the voltage applied to its inverse input 71.

The discharge of the capacitor 92 is effected, on the one hand, through a resistor 73 connected to the output of the operational amplifier 61 and on the other hand, by means of a switching circuit having a constant current threshold comprising an NPN transistor 73' whose collector is connected to the junction between the resistors 73 and 91 and the capacitor 92 and whose emitter is connected to the output of the operational amplifier 61 through a resistor 74. The base of the transistor 73' is connected to the junction of two resistors 75 and 76 constituting a voltage divider bridge between a positive supply voltage and ground. It is clear that in such a construction, the threshold voltage of the transistor 73' is determined by the voltage at its base and consequently by the values of resistors 75 and 76.

The polarization of the operational amplifiers 61 and 81 is achieved by means of a resistance bridge constituted by resistors 77,78,79 mounted in series between ground and the positive voltage source, the direct input of the operational amplifier 61 being connected at the junction of resistors 77 and 78 while the inverse input of the operational amplifier 81 is connected at the junction of resistors 78 and 79. The difference between the threshold of operational amplifier 61 and the threshold of operational amplifier 81 constituting the operational threshold is therefore maintained constant and is a direct function of the resistor 78.

Figure 4:
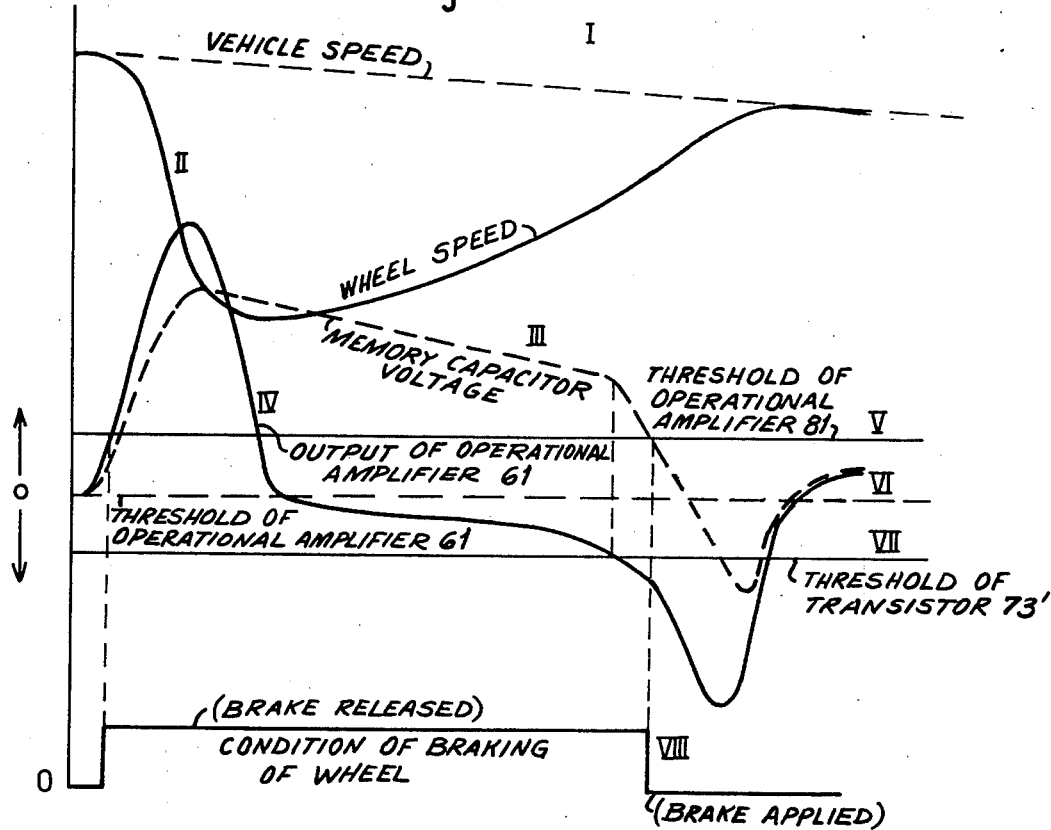
FIG. 4 is a graph showing different voltages as a function of time for the operation of the adjustment system according to the invention.

The operation of such an adjustment system for braking in the course of a braking sequence in which the wheel begins to slip will be described with reference to the graph shown in FIG. 4 in which:

curve I is a representative of the speed of the vehicle.
curve II is representative of the speed of the considered wheel of the vehicle which is proportional to the voltage delivered by the tachometric generator
curve III is the voltage at the terminals of the memory capacitor
curve IV is representative of the output voltage of the operational amplifier 61.
Line V represents the threshold of the operational amplifier 81.
Line VI represents the threshold of amplifier 61, that is to say, the voltage at the output of the operational amplifier 61 when the wheel travels at constant speed.
Line VII represents the threshold of transistor 73'; and
curve VIII represents the braking of the wheel.

At the beginning of the braking sequence, the wheel is in the braked stage (curve VIII) which is translated by a constant diminution of the speed of the vehicle (curve 1).

In the course of deceleration of the vehicle, the output voltage of the amplifier 61 is less than the threshold of the operational amplifier 81 which has no effect on the braking.

Following a skidding, the speed of the wheel decreases significantly (curve II) thus producing a substantial increase of the deceleration voltage at the output of the operational amplifier 61 which transmits this voltage to the memory 91, 92 which is charged by resistor 91 proportional to the amplitude and to the duration of the deceleration.

At the instant when the deceleration voltage reaches the threshold of the amplifier 81 the latter changes state and controls the release of the brake of the wheel (curve VIII) which then is released from the brakes.

Following this release of the brakes, the speed of the wheel will begin to increase which leads to a substantial drop of the deceleration voltage and the production of an acceleration voltage (below line VI).

At the instant when the acceleration voltage begins to decrease, the memory capacitor 92 discharges through the resistors 73 and the voltage decreases slowly.

When the acceleration voltage diminishes and passes the threshold of the transistor 73' (line VII) the transistor becomes conductive which produces an accelerated discharge of the capacitor 92 through the resistor 76 whose resistance value is less than that of the resistor 73.

It is suitable to note that the discharge of the capacitor 92 is proportional to the value of the acceleration of the wheel which permits adjustment of the delay to the actual time necessary to release the wheel from the brakes.

When the voltage at the terminals of the capacitor 92 becomes less than the threshold voltage of the operational amplifier 81, the wheel is again braked. The voltage of the capacitor 92 then continues to decrease to become equal to the output voltage of the amplifier 61 whereas the latter increases to reach a value corresponding to a normal deceleration of the wheel which is less than the threshold of the operational amplifier 81. Of course, if following this renewed braking the wheel begins to skid another identical cycle of operation will be produced.

What is claimed is:

1. A system for adjustment of braking applicable to the wheels of various types of vehicles and comprising for each of the wheels of the vehicles:
   a tachometric generator means for producing a signal as a function of the speed of the wheel,
   an assembly of a differentiator and a threshold amplifier having a variable gain as a function of frequency connected to the output of said generator means,
   a memory constituted by a first resistor connected in series with a capacitor,
   a diode connecting the amplifier and the memory to prevent discharge of the memory, threshold means connected to the output of said diode, electromagnet means including a coil for controlling braking operation of the wheel, a power amplifier connected to the output of said threshold means, and to the coil of said electromagnet means for controlling energization thereof, first discharge circuit means for the memory comprising a second resistor connected between the output of the assembly of the differentiator and amplifier and said capacitor, second discharge circuit means comprising switching means having a threshold for short-circuiting said first discharge circuit means and comprising a third resistor, and a voltage divider having two outputs respectively controlling the value of the threshold of the amplifier of said assembly and of said threshold means.

2. A system according to claim 1 in which said first discharge circuit means and said second discharge circuit means comprises separate first and second circuits both connected to the output of the amplifier of the assembly to effect a discharge of the memory according to the state of the wheel, the first discharge circuit not having any threshold and the second discharge circuit having a threshold, means establishing the threshold of the second discharge circuit comprising a transistor having a collector connected at the junction of the first resistor and the capacitor, an emitter connected to the output of the amplifier of said assembly and a base, and a resistance bridge disposed between ground and the positive terminal of a voltage source; said resistance bridge being connected to the base of the transistor for biassing the same to define the value of a switching threshold of said transistor.

3. A system according to claim 1 wherein said threshold amplifier with variable gain comprises a first operational amplifier having direct and inverse inputs, said differentiator being connected to said inverse input, said differentiator comprising, in series, a resistor and a capacitor and a counteracting means comprising a network of resistors and capacitors, the threshold of said operational amplifier being controlled by the voltage applied to its direct input, said threshold means comprising a second operational amplifier having a direct input connected to said diode and whose threshold is controlled by the voltage applied to its inverse input, a voltage divider bridge connected between ground and the positive terminal of a voltage supply source, said bridge being constituted by three resistors mounted in series, the direct input of said first operational amplifier being connected to the junction of the first and the second resistors of said bridge while the inverse input of the second operational amplifier is connected to the junction of the second and third resistors of said bridge.

4. A system according to claim 3 wherein the difference between the threshold value of said first and second operational amplifiers is constant and maintained by said second resistor of said voltage divider bridge.

* * * * *